(12) United States Patent
Guo

(10) Patent No.: US 11,006,086 B2
(45) Date of Patent: May 11, 2021

(54) PROJECTOR OPTICAL SYSTEM, PROJECTOR OPTICAL ENGINE, AND PROJECTION METHOD

(71) Applicant: NANHUA INTELLIGENT PRECISION MACHINE (SHENZHEN) CO., LTD., Guangdong (CN)

(72) Inventor: Hanwen Guo, Jiangsu (CN)

(73) Assignee: NANHUA INTELLIGENT PRECISION MACHINE (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/997,960

(22) Filed: Aug. 20, 2020

(65) Prior Publication Data

US 2020/0382751 A1 Dec. 3, 2020

(30) Foreign Application Priority Data

Apr. 27, 2020 (CN) .......................... 202010352931.3

(51) Int. Cl.
| | |
|---|---|
| *H04N 9/31* | (2006.01) |
| *G03B 21/14* | (2006.01) |
| *G03B 21/20* | (2006.01) |
| *G03B 21/00* | (2006.01) |

(52) U.S. Cl.
CPC ......... *H04N 9/3197* (2013.01); *G03B 21/006* (2013.01); *G03B 21/2073* (2013.01); *H04N 9/3167* (2013.01)

(58) Field of Classification Search
CPC ...... H04N 9/31; H04N 9/3197; H04N 9/3167; H04N 9/3108; H04N 9/3102; G03B 21/14; G03B 21/003; G03B 21/005; G03B 21/006; G03B 21/2033; G03B 21/2073; F21K 9/235; F21V 17/06; F21V 17/12; F21V 29/67; F21V 29/713
USPC .......................................................... 353/20
See application file for complete search history.

(56) References Cited

U.S. PATENT DOCUMENTS

| | | | | |
|---|---|---|---|---|
| 7,255,448 B2* | 8/2007 | Greer | ................... | G09G 3/3413 348/742 |
| 2020/0341353 A1* | 10/2020 | Guo | ..................... | G03B 21/006 |

* cited by examiner

*Primary Examiner* — William C. Dowling

(57) ABSTRACT

A projector optical system includes a LED (Light Emitting Diode) light source, an optical rod polarization conversion module, an overlapped lens module, a first mirror, a focusing lens, a LCD light valve, a field lens, a second mirror and a projection lens, which are sequentially arranged according to a traveling direction of lights. The optical rod polarization conversion module is for integration and polarized light conversion of natural lights emitted from the LED light source. The overlapped lens module is for superimposing integrated lights on the LCD light valve, so as to greatly improve light utilization of a projector and obviously save power supply consumption. Meanwhile, uniform illumination to the LCD light valve is realized, which obviously improves illumination uniformity and illumination efficiency. A projector optical engine is further provided, including the projector optical system.

13 Claims, 5 Drawing Sheets

PROJECTOR OPTICAL SYSTEM, PROJECTOR OPTICAL ENGINE, AND PROJECTION METHOD

CROSS REFERENCE OF RELATED APPLICATION

The application claims priority under 35 U.S.C. 119(a-d) to CN 202010352931.3, filed Apr. 27, 2020.

BACKGROUND OF THE PRESENT INVENTION

Field of Invention

The present invention relates to a field of projector, and more particularly to a projector optical system, a projector optical engine, and a projection method.

Description of Related Arts

In recent years, many enterprises and brands in China have continuously tried to make innovations for the projector products and markets and achieved remarkable results, which develops a broad market for the projector, namely the digital market of fast moving consumer goods. These innovative products, which are completely different from the traditional functional projector, have outstanding features of brightness, applicability of performances such as image quality, beautiful and fashion appearance, low power consumption and noise, built-in batteries and long duration, and are called as the popular projectors in industry. These popular projectors are based on the DLP (Digital Light Processing) technology and equipped with the solid light source, wherein DMD (Digital Micromirror Device) is exclusively provided by Texas Instruments and the solid light source is exclusively provided by OSRAM. The local enterprises fundamentally lack the intellectual property of these materials involving the technical core.

However, the single LCD (Liquid Crystal Display) projector is completely different. The local industry chain can independently develop the single LCD projector, and the cost performance competitiveness is obvious. For example, the cost of the single LCD projector of 720P and 150 Lm is less than one fifth of the cost of the DLP popular projector having the same indicator. Meanwhile, the image effects of the single LCD projector, such as contrast and focusing definition, have reached and even exceeded the performance of the DLP popular projector. Thus, the single LCD projector is one of the few up-gradation ways of the domestic popular projector.

The biggest constraints of the single LCD projector technology are that: when reaching the brightness indicator of the DLP popular projector, the power consumption and noise are relatively large; the photoelectric efficiency ($\eta$, namely dividing the output brightness of the projector by input electric power of the light source) is low; it is difficult to be equipped with the batteries and achieve the long duration at the moment; moreover, there is a huge gap between the brightness uniformity of the single LCD projector and the above popular projectors.

Conventionally, $\eta$ of the single LCD projector is generally about 0.8-4 Lm/w, while $\eta$ of the DLP popular projector reaches 10-17 Lm/w. Thus, if want to the high-consumption low-efficiency single LCD projector becoming popular, it is necessary to improve the photoelectric efficiency and make $\eta$ close to or basically reach the technical level of the DLP popular projector; moreover, an optical integration device must be arranged, so as to realize uniform illumination to the LCD light valve.

Therefore, comprehensive and radical innovations should be made on the conventional simple and low-efficient illumination technology of the single LCD projector, so as to narrow and eliminate the gap between the photoelectric efficiency of the single LCD projector and the DLP popular projector, which is the problem needed to be solved by the present invention.

SUMMARY OF THE PRESENT INVENTION

In order to solve deficiencies in prior art, the present invention provides a projector optical system, which effectively improves a photoelectric efficiency of a single LCD (Liquid Crystal Display) projector and uniformity of LCD light valve illumination.

In order to accomplish the above object, a projector optical system is provided, comprising a LED (Light Emitting Diode) light source, an optical rod polarization conversion module, an overlapped lens module, a first mirror, a focusing lens, a LCD light valve, a field lens, a second mirror and a projection lens, which are sequentially arranged according to a traveling direction of lights.

The optical rod polarization conversion module comprises an integration rod, a polarized light modulation plate and a brightening polarizer, which are sequentially bonded according to the traveling direction of the lights.

A light transmitting part for light transmission and a reflecting part for light reflection are arranged on an incident surface of the integration rod.

A size and an area of the light transmitting part are larger than or equal to that of a light emitting surface of the LED light source.

The light transmitting part is opposite to the light emitting surface of the LED light source.

Preferably, the integration rod is a solid glass rod, wherein four inner walls of the integration rod are plane inner walls with hollow light tunnels having a light reflection function, or curved inner walls with hollow light pipes having the light reflection function.

Preferably, length, width and area of the incident surface of the integration rod are smaller than or equal to that of an emergent surface of the integration rod.

Preferably, an optical extend of the incident surface of the integration rod under illumination of the LED light source is smaller than or equal to an optical extend of the LCD light valve under constraints of the projection lens.

Preferably, a length-to-width ratio of the emergent surface of the integration rod is equal to a width-to-height ratio of a display window of the LCD light valve, but not limited to absolutely equal.

Preferably, the length and the width of the incident surface and the emergent surface of the glass rod are same.

Preferably, the polarized light modulation plate adopts a phase plate or a broadband depolarizer.

Preferably, the polarized light modulation plate adopts at least one of a passive rotator which does not change a polarization state of an incident polarized light, a passive delayer which changes the polarization state of the incident polarized light, and an active rotator.

Preferably, the polarized light modulation plate adopts a scattering sheet or a diffusing sheet.

Preferably, the phase plate is a random phase plate.

Preferably, the depolarizer is hexahedral; sizes of light transmitting sections of the depolarizer and the glass rod are same; after an incident surface of the depolarizer is bonded to the emergent surface of the glass rod, the depolarizer is equivalent to a portion of the glass rod in optics, so as to improve efficiency and integration effect of the optical rod polarization conversion module.

Preferably, the passive delayer adopts at least one of a quarter wave plate and an eighth wave plate.

Preferably, the brightening polarizer adopts a wire grid polarizer or a reflective polarizer, having a brightening function.

Preferably, the overlapped lens module comprises at least two lenses which are sequentially arranged according to the traveling direction of the lights.

Preferably, the overlapped lens module further comprises a sleeve for fixing the lenses.

Preferably, the number of the lenses of the overlapped lens module is three, respectively a first lens, a second lens, and a third lens, which are sequentially arranged according to the traveling direction of the lights.

Preferably, a substrate of the LED light source is bonded to the sleeve.

Preferably, the light transmitting part and the reflecting part on the incident surface of the integration rod are formed on a transmitting and reflecting plate; the reflecting part of the transmitting and reflecting plate is bonded to the integration rod.

Preferably, the transmitting and reflecting plate adopts a mirror aluminum plate; the light transmitting part on the transmitting and reflecting plate is a through-hole opened on the mirror aluminum plate.

The present invention further provides a projector optical engine, comprising a radiator, a fan, a dust prevention device, an optical engine cover and the projector optical system, wherein: the projector optical system, the fan and the dust prevention device are arranged on the optical engine cover; ventilation channels are formed between the focusing lens and the LCD light valve and between the LCD light valve and the field lens; the dust prevention device and the fan are respectively located at an air inlet and an air outlet of the ventilation channels; the radiator is for dissipating heat of the LED light source, and the fan aligns to fins of the radiator; for the optical engine cover, except a position of the dust prevention device for air supplying and a position of the fan for air discharging, other positions are sealed.

The present invention further provides a projection method of the projector optical system, comprising steps of: after integration and polarized light conversion of lights emitted from the LED light source through the optical rod polarization conversion module, superimposing integrated lights on the LCD light valve through the overlapped lens module after reflection of the first mirror and focusing of the focusing lens; by lights emitted from the LCD light valve, sequentially passing through the field lens and the second mirror, and being projected form the projection lens.

Preferably, a total increment $\eta_{inc}$ of light utilization efficiency of a projector by the optical rod polarization conversion module is:

$$\eta_{inc} = \Delta\Psi_R + \Delta\Psi_L;$$

wherein:

$$\Delta\Psi_R = 0.5 \times \beta \times T_L \times T_p \times \left\{ \sum_{n=1}^{\infty} [R_P \times (1 - A_S/A_L) \times R_M \times T_L^2]^n \times (1 - \beta)^{n-1} \right\};$$

-continued $$\Delta\Psi_L = 0.5 \times \beta \times T_L \times T_p \times \left[ \sum_{n=1}^{\infty} (R_P \times L_R \times T_L^2 \times A_S/A_L)^n \times (1 - \beta)^{n-1} \right];$$

$\Delta\Psi_R$ represents a corresponding increment of the light utilization efficiency of the projector by the reflecting part; $\Delta\Psi_L$ represents a corresponding increment of the light utilization efficiency of the projector by the LED light source; $\beta$ represents a modulation efficiency of the polarized light modulation plate; $T_L$ represents transmittance of the integration rod; $T_p$ and $R_P$ respectively represent transmittance and reflectance of the brightening polarizer; $A_S$ represents an area of the light transmitting part; $A_L$ represents an area of the incident surface of the integration rod; $R_M$ represents a surface reflectance of the reflecting part; and $L_R$ represents a combined reflectance of the light emitting surface and the substrate of the LED light source.

The present invention has beneficial effects as follows.

Firstly, according to the present invention, through integration and polarized light conversion of the natural lights emitted from the LED light source by the optical rod polarization conversion module, and through the superimposition of the integrated lights on the LCD light valve by the overlapped lens module, the light utilization efficiency of the projector is greatly increased, the power supply consumption is saved, and the uniform illumination to the LCD light valve is realized.

Secondly, the present invention adopts the integration rod; the integration rod easily matches the size of the light emitting surface of the LED light source and the shape of the display window of the LCD light valve, so as to greatly increase the utilization of the LED light source.

Thirdly, according to the present invention, the light transmitting part and the reflecting part of the incident surface of the integration rod are formed on the independent transmitting and reflecting plate, so that the production difficulty of the integration rod is reduced and the transmitting and reflecting plate conveniently matches with the integration rod.

Fourthly, according to the present invention, the LED light source, the optical rod polarization conversion module and the overlapped lens module are integrated through the sleeve to form a precise illumination assembly module, which improves the production process and increases the production efficiency.

Fifthly, after comprehensively and essentially improving the illumination efficiency, the present invention innovatively enables the single LCD projector to satisfy the conditions of equipping with the batteries and keeping the reasonable photoelectric efficiency required by the long duration, having the good innovation, cost performance and practicability, so that the single LCD projector becomes low power-consumed and highly-efficient and gets the possibility to be the high-quality popular projector to contact the wider market.

BRIEF DESCRIPTION OF THE DRAWINGS

In order to illustrate the technical solutions in the embodiments of the present invention or prior art more clearly, the accompanying drawings for describing the embodiments or the prior art are simply described below. Apparently, the accompanying drawings in the following description are only some embodiments of the present invention, and persons of ordinary skill in the art can derive other drawings from the accompanying drawings without creative efforts.

DETAILED DESCRIPTION OF THE PREFERRED EMBODIMENT

Figure 1:
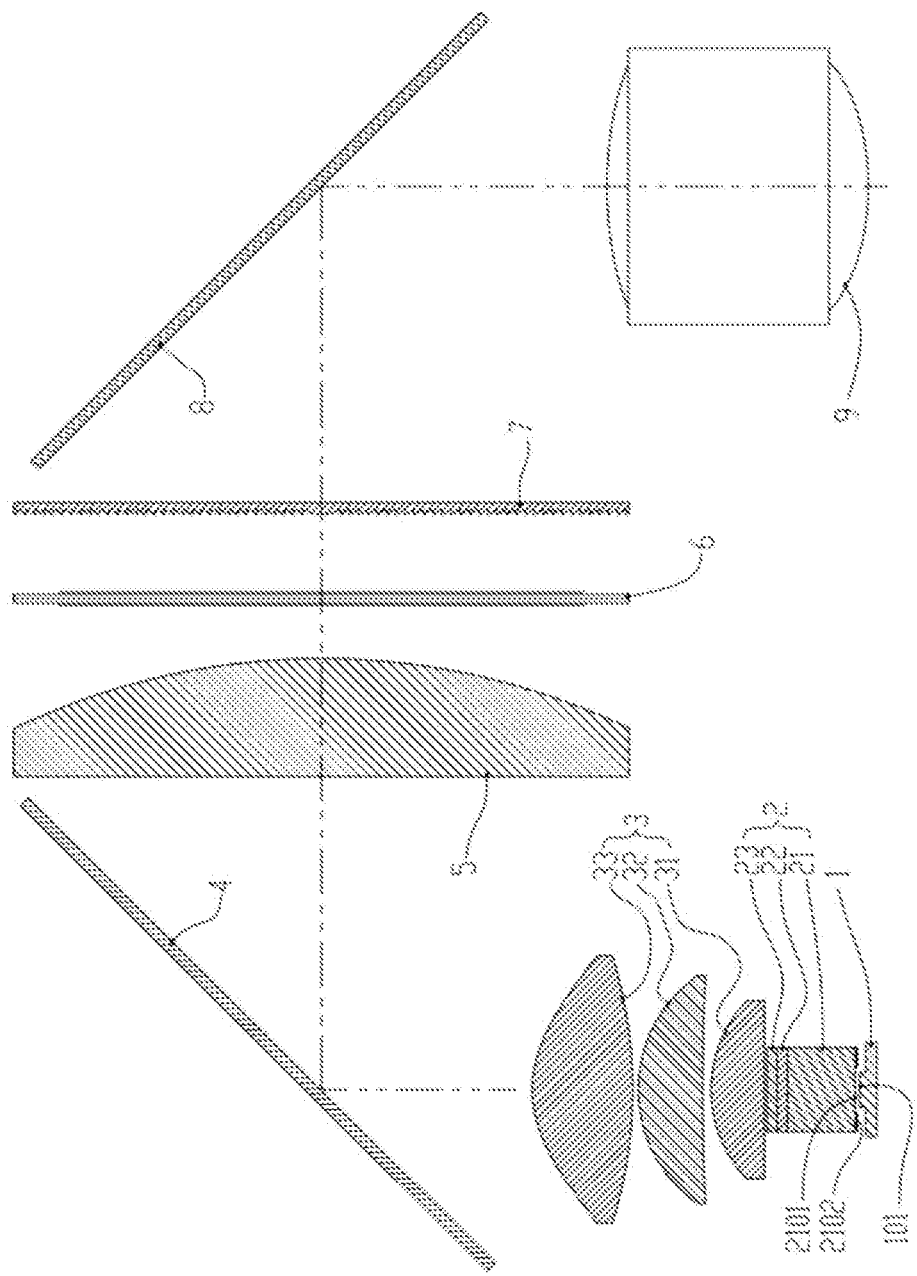
FIG. 1 is a structural sketch view of a projector optical system according to the present invention.

In order to make one of ordinary skill in the art better understand the technical solutions of the present invention, the present invention is described in detail with the accompanying drawings as follows. The description of the preferred embodiments is exemplary and interpretive, not for limiting the protection scope of the present invention.

It should be noted that: the similar reference characters and letters in the drawings represent the similar elements. Thus, once one element is defined in one drawing, there is no need to further define and explain the element in the subsequent drawings.

It should be noted that: the directions or positional relationships indicated by the terms such as "center", "up", "down", "left", "right", "vertical", "horizontal", "inner" and "outer" are the directions or positional relationships based on the drawings, or the usual directions or positional relationships when using. There terms are only for conveniently describing the present invention and simplifying the description, not for indicating or implying the specific direction and the structure and operation in the specific direction of the devices or elements. Thus, there terms cannot be interpreted as the limitations to the present invention. Moreover, the terms such as "first", "second" and "third" are only for distinguishing, not for indicating or implying the relative importance.

Moreover, the terms such as "horizontal", "vertical" and "suspended" do not represent that the parts must be horizontal or suspended, but can tilt slightly. For example, the term of "horizontal" only represents that the direction is more horizontal relative to the term of "vertical", and does not represent that the structure must be completely horizontal, but can tilt slightly.

In the description of the present invention, it should be also noted that: except clearly defined and limited, the terms of "arrange", "mount", "link" and "connect" should be understood broadly. For example, the connection can be fixed connection, detachable connection or integrated connection; the connection can be mechanical connection or electric connection; the connection can be direct connection, indirect connection through the medium, or the interconnection between the two elements. One of ordinary skill in the art can understand the concrete meanings of the above terms in the present invention according to the specific situation.

It should be specifically noted that: in the present invention, because a distance between a light emitting surface 101 of a LED (Light Emitting Diode) light source 1 and an incident surface of an integration rod 21 is very short (the shorter distance, the higher system efficiency), during the optical design and analysis, it can be considered that the light emitting surface 101 of the LED light source 1 and the incident surface of the integration rod 21 are on the same plane (hereinafter the same); during the optical design and analysis, it is determined whether the emergent surface of the integration rod 21 becomes a portion of the equivalent side reflection surface of the integration rod 21 in optics according to the thickness and the side of the polarized light modulation plate 22; in order to facilitate analysis, it does not strictly distinguish whether the emergent surface of the integration rod 21 described below is the own physical emergent surface of the integration rod 21, or the equivalent emergent surface of the integration rod after the polarized light modulation plate 22 is involved in the optical integration.

First Preferred Embodiment

Figure 2:
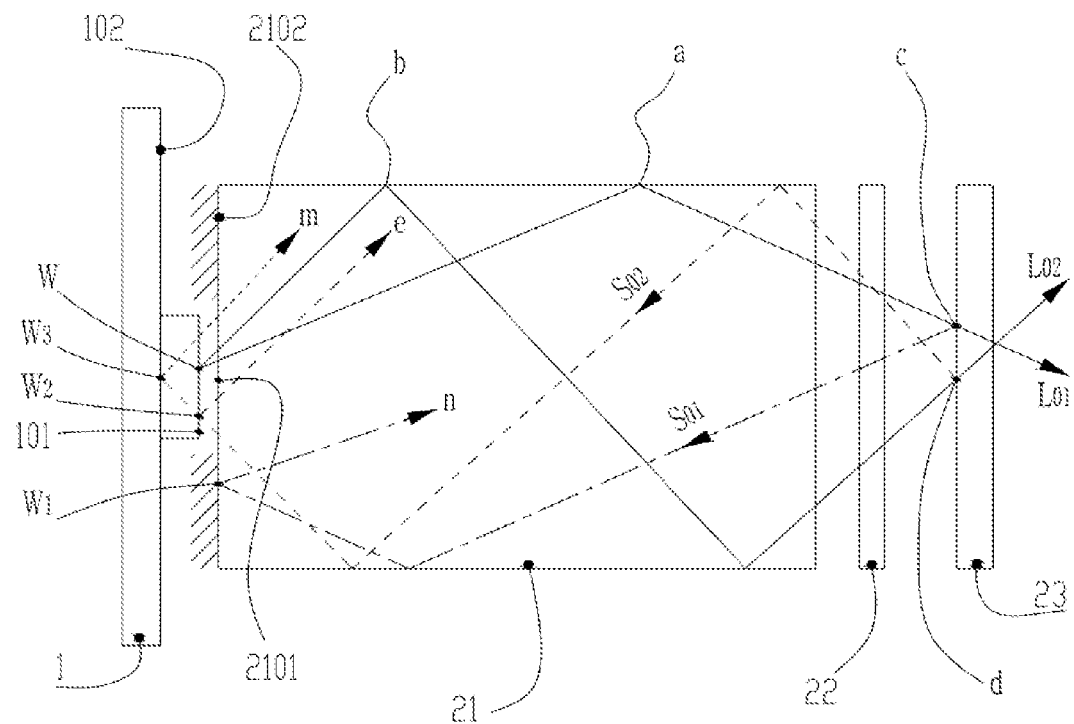
FIG. 2 is a principle sketch view of polarization conversion according to the present invention.
Figure 3:
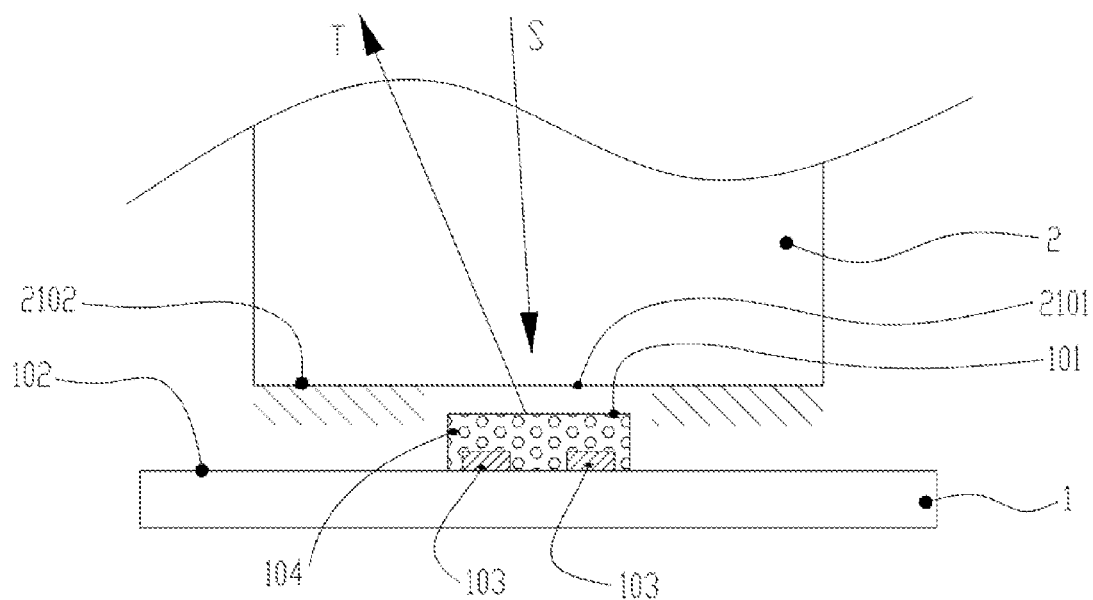
FIG. 3 is a local sketch view corresponding to a position of a LED (Light Emitting Diode) light source in FIG. 1.

As shown in FIGS. 1-3, according to a first preferred embodiment, a projector optical system is provided, comprising a LED light source 1, an optical rod polarization conversion module 2, an overlapped lens module 3, a first mirror 4, a focusing lens 5, a LCD (Liquid Crystal Display) light valve 6, a field lens 7, a second mirror 8 and a projection lens 9, which are sequentially arranged according to a traveling direction of lights.

In the first preferred embodiment, lights (natural lights) emitted from a light emitting surface 101 of the LED light source 1 is incident on the optical rod polarization conversion module 2 for integration and polarization conversion through a light transmitting part 2101 of an integration rod 21, and then further incident on the overlapped lens module 3; multiple light source images on an emergent surface of the integration rod 21 are superimposed on the LCD light valve 6, so as to realize uniform illumination to the LCD light valve 6; the focusing lens 5 enables illumination lights of the LCD light valve 6 to align with an incident pupil of the projection lens 9, so as to realize highly-efficient transmission of the lights.

As shown in FIG. 1, the overlapped lens module 3 comprises a first lens 31, a second lens 32 and a third lens 33 which are sequentially arranged. Conjugation relations are: the light emitting surface 101 of the LED light source 1 is conjugated with the second lens 32; the second lens 32 is conjugated with the incident pupil of the projection lens 9; the emergent surface of the integration rod 21 is conjugated with the LCD light valve 6; the LCD light valve 6 is conjugated with a projection screen (not shown in figures).

As shown in FIG. 1, the LED light source 1 and the optical rod polarization conversion module 2 are sequentially arranged according to the traveling direction of the lights, wherein: the optical rod polarization conversion module 2 consists of the integration rod 21, a polarized light modulation plate 22 and a brightening polarizer 23, which are sequentially bonded.

In the first preferred embodiment, the integration rod 21 is a solid glass rod; sizes of the emergent surface and the incident surface of the integration rod are same; the polarized light modulation plate 22 adopts a broadband depolarizer; the brightening polarizer 23 adopts a wire grid polarizer; sizes of the light transmitting sections of the depolarizer and the glass rod are same; a total reflection effect of four sides of the depolarizer in optics equivalently lengthens the integration rod 21; a gap between the light emitting surface 101 of the LED light source 1 and the incident surface of the integration rod 21 is 0.05-0.12 mm.

As shown in FIG. 2, two lights, respectively Wa and Wb, are arbitrarily emitted from a W point on the light emitting surface 101 of the LED light source 1, then enter the integration rod 21 from the light transmitting part 2101 and pass through the polarized light modulation plate 22, and finally respectively reach a "c" point and a "d" point on the brightening polarizer 23.

Thereafter, the brightening polarizer 23 splits the light $L_{01}$ meeting requirements from the light Wa for transmission, and the light $S_{01}$ is reflected; the lights $L_{01}$ and $S_{01}$ are linearly polarized lights whose amplitudes are same and vibrations are orthogonal; after the light $S_{01}$ is reflected back and passes through the polarized light modulation plate 22, a polarization degree of the light $S_{01}$ is degraded, and the light $S_{01}$ enters the integration rod 21 from the emergent surface, reaches a $W_1$ point of a reflecting part 2102 on the incident surface of the integration rod 21, and is reflected; the reflected light $W_{1n}$ enters the integration rod 21 and passes through the polarized light modulation plate 22 again, so that the polarization degree is further degraded and the light $W_{1n}$ closes to the natural lights; the brightening polarizer 23 conducts the polarization splitting again, so that lights conforming to the transmission axis is transmitted and the residual lights are reflected back, thereby repeating the processes such as depolarization, reflection and polarization splitting again.

At the same time, the light Wb is polarized and split at a "d" point on the brightening polarizer 23, so that the light $L_{02}$ is transmitted and the light $S_{02}$ is reflected; the lights $L_{02}$ and $S_{02}$ are linearly polarized lights whose amplitudes are same and vibrations are orthogonal; polarization plane directions of the lights $L_{02}$ and $L_{01}$ are same.

After passing through the polarized light modulation plate 22, a polarization degree of the light $S_{02}$ is degraded, and the light $S_{02}$ enters the integration rod 21, reaches a $W_2$ point on the light emitting surface 101 of the LED light source 1 through the light transmitting part 2101 on the incident surface of the integration rod 21, and is reflected and refracted at the $W_2$ point, wherein: a part of the light, $W_{2e}$, is reflected and enters the integration rod 21; a part of the light, $W_2W_3$, is refracted, then continues travelling, reaches a $W_3$ point on a substrate 102 of the LED light source 1 and is reflected by the substrate 102 of the LED light source 1, wherein the reflected light $W_{3m}$ enters the integration rod 21; after the lights $W_{2e}$ and $W_{3m}$ enter the integration rod 21, the processes similar as the lights Wa and Wb are repeated.

It should be specifically noted that: as shown in FIG. 3, the natural light T emitted by the LED light source 1 is polarized and split by the optical rod polarization conversion module 2, and a part of the light, as the linearly polarized light S, is reflected back, wherein the reflectance of the light emitting surface 101 of the LED light source 1 is generally 3%-4%; although the reflectance of the substrate 102 of the LED light source 1 is generally larger than 90%, due to blocking of the LED wafers 103 (both of the area and the thickness of the LED wafers 103 influence the reflection effect of the substrate 102) and the fluorescent powders and silica gel 104, the actual reflection area of the substrate 102 is determined according to the arrangement of the LED wafers 103. Even so, the contributions of the light emitting surface 101 and the substrate 102 of the LED light source 1 on polarization conversion in the first preferred embodiment cannot be ignored. The total efficiency, considering blocking of the fluorescent powders and silica gel 104, the equivalent effective reflection capacity of the gap between the LED wafers 103, the secondary excitation to the fluorescent powders in the fluorescent powders and silica gel 104 by the shortwave component in the light S for illumination, and the total reflection loss of the lights on the light emitting surface 101 from the optically denser medium to the optically thinner medium, greatly improves the photoelectric efficiency of the projector optical system.

The lights, which pass through the $W_2$ point on the light emitting surface 101 of the LED light source 1 and are not reflected back to the integration rod 21, are absorbed by the LED wafers 103, the fluorescent powders and silica gel 104, and the substrate 102 of the LED light source 1, and converted into the joule heat.

Second Preferred Embodiment

As shown in FIGS. 1-3, in the second preferred embodiment, the integration rod 21 is a solid glass rode, and the sizes of the incident surface and the emergent surface of the integration rod are same; the polarized light modulation plate 22 adopts a phase plate; the brightening polarizer 23 adopts a wire grid polarizer; wherein: a necessary air gap exists between an emergent surface of the phase plate and an incident surface of the wire grid polarizer.

In the second preferred embodiment, the process of reaching the wire grid polarizer of the lights emitted by the LED light source 1 is not repeated herein.

Referring to the first preferred embodiment, the light $S_{01}$ is reflected by the brightening polarizer 23; after passing through the polarized light modulation plate 22, a phase of the light $S_{01}$ is randomly changed, and the light $S_{01}$ enters the integration rod 21, is reflected at the $W_1$ point on the reflecting part 2102, enters the integration rod 21 again, and passes through the polarized light modulation plate 22 again; thereafter, the phase of the light $S_{01}$ is further randomly changed, and the light $S_{01}$ is incident on the brightening polarizer 23; the brightening polarizer 23 splits the lights conforming to the transmission axis from the light $S_{01}$ for transmission, and the residual lights are reflected back again.

Further referring to the first preferred embodiment, the process of passing through the light transmitting part 2101 and being incident on the LED light source 1 of the light $S_{02}$ is not repeated herein.

The lights which pass through the polarized light modulation plate 22 and then are incident on the brightening polarizer 23 and the lights which are reflected back to the polarized light modulation plate 22 by the brightening polarizer 23 do not return back along the original way (except the light on the central axis); that is to say, for one light, when being incident and emergent through the phase plate, the points on the phase plate are not same; thus, not like a simple transmission purpose, the phase plate needs no mechanical motion to achieve the more efficient phase change, which lays a foundation for the highly-efficient and simple polarization conversion of the second preferred embodiment.

It is assumed that the total lights emergent through the optical rod polarization conversion module 2 are $Lpo=L_{01}+L_{02}+L_{03}+\ldots+L_n$; in the second preferred embodiment, an increment of the light utilization efficiency by polarization conversion is calculated through a formula of:

$$\eta_{inc}=\Delta\Psi_R+\Delta\Psi_L;$$

wherein: in the formula, $$\Delta\Psi_R = 0.5\times\beta\times T_L\times T_p\times\left\{\sum_{n=1}^{\infty}[R_P\times(1-A_S/A_L)\times R_M\times T_L^2]^n\times(1-\beta)^{n-1}\right\};$$

-continued $$\Delta\Psi_L = 0.5 \times \beta \times T_L \times T_P \times \left[ \sum_{n=1}^{\infty} (R_P \times L_R \times T_L^2 \times A_S/A_L)^n \times (1-\beta)^{n-1} \right];$$

$\Delta\Psi_R$ represents a corresponding increment of the light utilization efficiency of the projector by the reflecting part 2102; $\Delta\Psi_L$ represents a corresponding increment of the light utilization efficiency of the projector by the LED light source 1, equivalent to an increment of the light utilization efficiency of the projector by the light transmitting part 2101; $\beta$ represents a modulation efficiency of the polarized light modulation plate 22, in energy percentage; $T_L$ represents transmittance of the integration rod 21; $T_p$ and $R_p$ respectively represent transmittance and reflectance of the brightening polarizer 23; $A_S$ represents an area of the light transmitting part 2101; $A_L$ represents an area of the incident surface of the integration rod 21; $R_M$ represents a surface reflectance of the reflecting part 2102; and $L_R$ represents the combined reflectance of the light emitting surface 101 and the substrate 102 of the LED light source 1.

The effects of the second preferred embodiment of the present invention are described with the specific data as follows.

For the conventional single LCD projector, between the LED light source and the front Fresnel lens, either one lens serves as the light condenser, or one pyramidal light condenser (one of the V-shaped light funnels) completes light condensation. The optical system sequentially comprises components of: the LED light source, the light condenser, the front Fresnel lens, the LCD light valve, the back Fresnel lens (field lens), and the projection lens.

Generally, the efficiency of the lights emitted from the LED light source of reaching the position of the polarizer at the incident side of the LCD light valve is not over 63%. If the transmittance of the LCD light valve is 6%, the field lens efficiency is 92% and the projection lens efficiency is 98%, the total efficiency of the optical system of the above conventional single LCD projector is about 3.4%. If the luminous flux of the LED light source is 4000 Lm and the power is 35 W, the output brightness of the projector is 136 Lm, $\eta=136$ (Lm)/35 (W)=3.9 Lm/w.

In the second preferred embodiment, the luminous flux of the LED light source 1 is 4000 Lm; the power is 35 W; the combined efficiency of the overlapped lens module 3, the first mirror 4 and the focusing lens 5 is 94%; the transmittance of the LCD light valve 6 is 6%; the combined efficiency of the field lens 7, the second mirror 8 and the projection lens 9 is 89.2%; the optical extend of the incident and emergent surfaces of the integration rod 21 is less than or equal to the optical extend of the LCD light valve 6 under the constraints of the projection lens 9.

Furthermore, according to the second preferred embodiment, under a situation that the polarized light modulation plate 22 and the brightening polarizer 23 are not arranged, at the emergent surface of the integration rod 21, the luminous flux (natural lights) $L_{nat}$ of larger than 3700 Lm is obtained. According to the optical system of the present invention, the output brightness is 186 Lm, and $\eta=5.3$ Lm/w. Compared with prior art, $\eta$ is obviously increased by 1.36 times.

Furthermore, under a situation that the polarized light modulation plate 22 and the brightening polarizer 23 are arranged, the output (the linearly polarized lights) at the emergent surface of the brightening polarizer 23 is Lpo=2680-3100 Lm; because Lpo are the polarized lights meeting the requirements of the LCD light valve 6 and the extinction ratio is enough, the polarizer at the incident surface of the LCD light valve 6 can be removed. Combined with the constitute factors of the transmittance of the LCD light valve 6, namely the efficiency of the incident polarizer of the LCD light valve 6 to the natural lights is about 36%-42% (calculated by 42%), after removing the incident polarizer, the transmittance of the LCD light valve 6 is 6%÷42%=14.3%, the output of the projector is 342-393 Lm, and $\eta$ reaches 9.8-11.2 Lm/w, which basically reaches the level of the DLP (Digital Light Processing) popular projectors.

The conventional popular projectors generally adopt the common 18650 batteries (with the capacity of about 3.7V/2600 mAH) to pursue the high cost performance, equipped with about five batteries. If want to ensure the duration of watching one film (larger than or equal to two hours) and the discharge threshold with five 18650 batteries, the projection applicability on the screen larger than or equal to 60 inches in the dark environment can be realized only when the total power of the projector is not over 18 W, the power of the light source is limited within 15 W (the smaller power, the longer duration), and the brightness is larger than or equal to 100 Lm. With the optical system provided by the second preferred embodiment, when the power of the LED light source 1 is 9-10 W, the output is about 100-110 ANSILm; when the power of the LED light source 1 is 15 W, the output is about 150 ANSILm. The present invention completely exceeds the levels of color, contrast ratio and focused image quality of the mid-low end DLP popular projectors, reaches the brightness and uniformity levels thereof, and basically reaches $\eta$ thereof, while the cost of the present invention is less than one third of the cost thereof and no supply chain bottleneck exists, which has the good innovative value.

Third Preferred Embodiment

Figure 4:
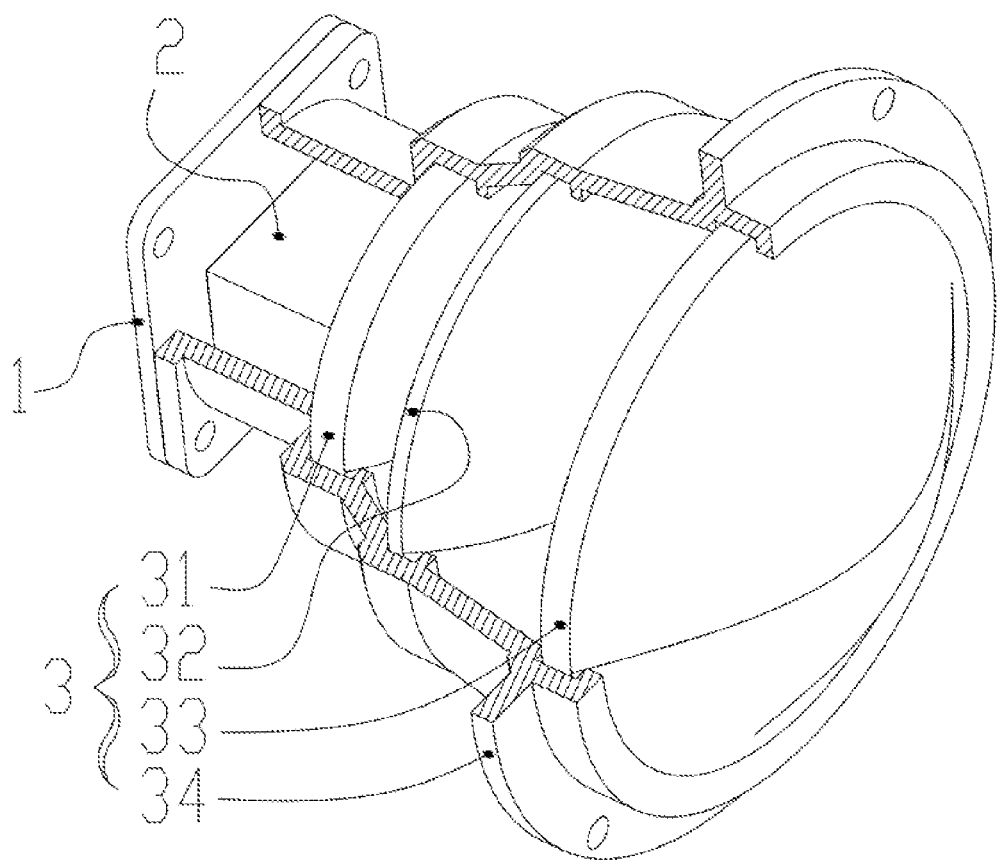
FIG. 4 is a perspective view of assembled LED light source, optical rod polarization conversion module and overlapped lens module in FIG. 1.
Figure 5:
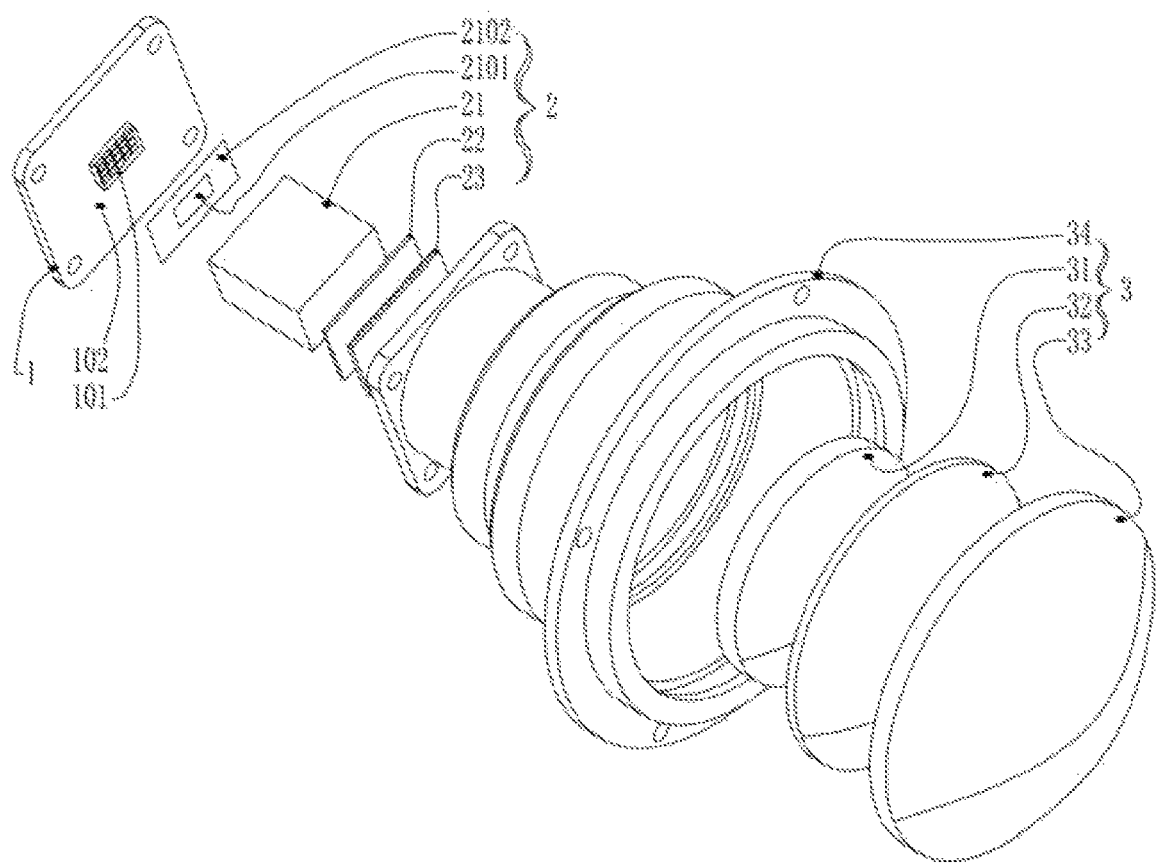
FIG. 5 is an exploded view of FIG. 4.
Figure 6:
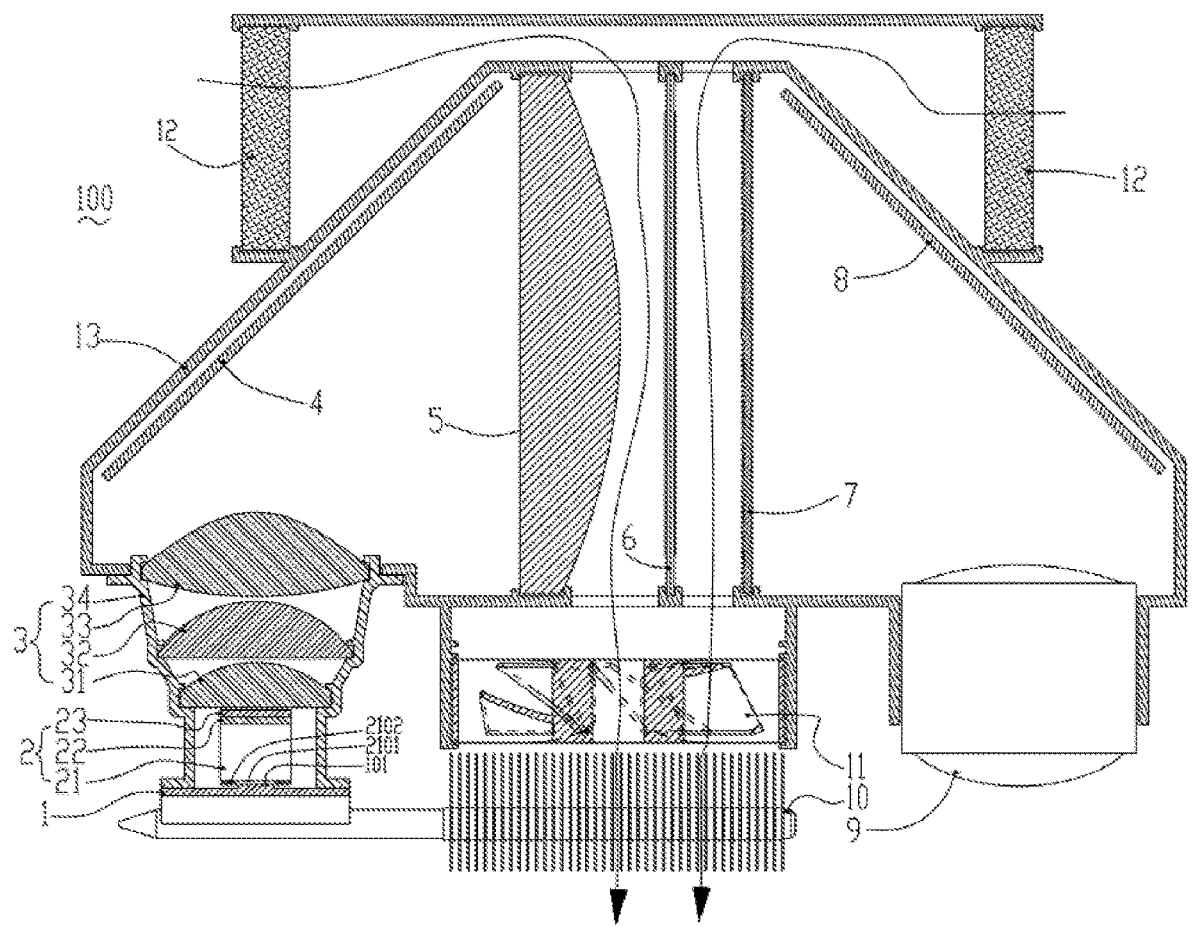
FIG. 6 is a structural sketch view of a projector optical engine according to the present invention.

According to the third preferred embodiment, the relatively precise assembly is required to achieve the relatively good photoelectric efficiency, especially the assembly precision of the LED light source 1, the optical rod polarization conversion module 2 and the overlapped lens module 3, as shown in FIGS. 4-6.

As shown in FIGS. 4-5, the first lens 31, the second lens 32 and the third lens 33 of the overlapped lens module 3 are arranged in a precise sleeve 34; the LED light source 1, the optical rod polarization conversion module 2 and the overlapped lens module 3 are integrated to form a precise illumination assembly module, so that more flexible process deployment can be achieved during production. After achieving the relatively good coaxiality and precision, the above optical components are arranged on an optical engine cover 13, so that the structural precision requirements on the optical engine cover 13 are decreased and the cost is reduced.

Furthermore, FIG. 5 is an exploded view of the illumination assembly module integrated with the LED light source 1, the optical rod polarization conversion module 2 and the overlapped lens module 3. When the integration rod is a glass rod, because four total reflection surfaces of the glass rod cannot contact other materials, the incident surface of the transmitting and reflecting plate is bonded to the substrate 102 of the LED light source 1, the reflecting part on the emergent surface of the transmitting and reflecting plate is bonded to the integration rod 21, and then the components are assembled with the sleeve 34; alternatively, the emergent surface of the optical rod polarization conversion module 2, namely the emergent surface of the brightening polarizer 23, is bonded to the incident surface of the first lens 31, so as to assemble the components into the sleeve 34 through the first lens.

Fourth Preferred Embodiment

As shown in FIG. 6, the fourth preferred embodiment of the present invention provides a projector optical engine 100, comprising a radiator 10, a fan 11, a dust prevention device 12, an optical engine cover 13, and the projector optical system in one of the first to third preferred embodiments. The projector optical system, the fan 11 and the dust prevention device 12 are arranged on the optical engine cover 13; ventilation channels are formed between the focusing lens 5 and the LCD light valve 6 and between the LCD light valve 6 and the field lens 7; the dust prevention device 12 and the fan 11 are respectively located at the air inlet and the air outlet of the ventilation channels; the radiator 10 is for dissipating heat of the LED light source 1, and the fan 11 aligns to the fins of the radiator 10; for the optical engine cover 13, except the position of the dust prevention device 12 for air supplying and the position of the fan 11 for air discharging, other positions are sealed.

In the fourth preferred embodiment, under the effects of the fan 11 and the radiator 10, the simultaneous heat dissipation of the LCD light valve 6 and the LED light source 1 is realized; through preventing dust by the dust prevention device 12, a service life of the projector is lengthened.

In the fourth preferred embodiment, the LCD light valve 6 and the LED light source 1 adopt the same fan 11, so as to save the power supply consumption of the projector; moreover, the overall structure of the projector optical engine is compact, which reduces the overall size of the projector optical engine and the running noise of the projector.

In the fourth preferred embodiment, the LED light source 1, the optical rod polarization conversion module 2 and the overlapped lens module 3, as one optical part module, realize the relatively good coaxiality and precision; when being arranged on the optical engine cover 13, the structural precision requirements on the optical engine cover 13 are effectively decreased, the cost is reduced, and the production efficiency is improved.

The basic principles, main features and advantages of the present invention are described above. One of ordinary skill in the art should know that: the present invention is not limited by the above preferred embodiments; the above preferred embodiments and the description in the specification are only for illustrating the principles of the present invention; various changes and improvements made without departing from the spirit and range of the present invention should be all encompassed in the protection scope of the present invention. The protection scope of the present invention is defined by the claims and the equivalents thereof

What is claimed is:

1. A projector optical system, comprising a LED (Light Emitting Diode) light source (1), an optical rod polarization conversion module (2), an overlapped lens module (3), a first mirror (4), a focusing lens (5), a LCD (Liquid Crystal Display) light valve (6), a field lens (7), a second mirror (8) and a projection lens (9), which are sequentially arranged according to a traveling direction of lights; wherein:
the optical rod polarization conversion module (2) comprises an integration rod (21), a polarized light modulation plate (22) and a brightening polarizer (23), which are sequentially bonded according to the traveling direction of the lights;
a light transmitting part (2101) for light transmission and a reflecting part (2102) for light reflection are arranged on an incident surface of the integration rod (21);
a size and an area of the light transmitting part (2101) are larger than or equal to that of a light emitting surface (101) of the LED light source (1); and
the light transmitting part (2101) is opposite to the light emitting surface (101) of the LED light source (1).

2. The projector optical system, as recited in claim 1, wherein: the integration rod (21) is a solid glass rod; four inner walls of the integration rod are plane inner walls with hollow light tunnels having a light reflection function, or curved inner walls with hollow light pipes having the light reflection function.

3. The projector optical system, as recited in claim 1, wherein: the polarized light modulation plate (22) adopts a phase plate or a broadband depolarizer; or
the polarized light modulation plate (22) adopts at least one of a passive rotator which does not change a polarization state of an incident polarized light, a passive delayer which changes the polarization state of the incident polarized light, and an active rotator; or
the polarized light modulation plate (22) adopts a scattering sheet or a diffusing sheet.

4. The projector optical system, as recited in claim 3, wherein: the passive delayer adopts at least one of a quarter wave plate and an eighth wave plate.

5. The projector optical system, as recited in claim 1, wherein: the brightening polarizer (23) adopts a wire grid polarizer or a reflective polarizer, having a brightening function.

6. The projector optical system, as recited in claim 1, wherein: the overlapped lens module (3) comprises at least two lenses which are sequentially arranged according to the traveling direction of the lights.

7. The projector optical system, as recited in claim 6, wherein: the overlapped lens module (3) further comprises a sleeve (34) for fixing the lenses.

8. The projector optical system, as recited in claim 6, wherein: the number of the lenses is three, respectively a first lens (31), a second lens (32), and a third lens (33), which are sequentially arranged according to the traveling direction of the lights.

9. The projector optical system, as recited in claim 7, wherein: a substrate (102) of the LED light source (1) is bonded to the sleeve (34).

10. The projector optical system, as recited in claim 1, wherein: the light transmitting part (2101) and the reflecting part (2102) on the incident surface of the integration rod (21) are formed on a transmitting and reflecting plate; the reflecting part (2102) of the transmitting and reflecting plate is bonded to the integration rod (21).

11. A projector optical engine, comprising a radiator (10), a fan (11), a dust prevention device (12), an optical engine cover (13) and the projector optical system as recited in claim 1, wherein: the projector optical system, the fan (11) and the dust prevention device (12) are arranged on the optical engine cover (13); ventilation channels are formed between the focusing lens (5) and the LCD light valve (6) and between the LCD light valve (6) and the field lens (7); the dust prevention device (12) and the fan (11) are respectively located at an air inlet and an air outlet of the ventilation channels; the radiator (10) is for dissipating heat of the LED light source (1), and the fan (11) aligns to fins of the radiator (10); for the optical engine cover (13), except a position of the dust prevention device (12) for air supplying and a position of the fan (11) for air discharging, other positions are sealed.

12. A projection method of the projector optical system as recited in claim 1, comprising steps of:

after integration and polarized light conversion of lights emitted from the LED light source (1) through the optical rod polarization conversion module (2), superimposing integrated lights on the LCD light valve (6) through the overlapped lens module (3) after reflection of the first mirror (4) and focusing of the focusing lens (5); by lights emitted from the LCD light valve (6), sequentially passing through the field lens (7) and the second mirror (8), and being projected form the projection lens (9).

13. The projection method, as recited in claim 12, wherein: a total increment $\eta_{inc}$ of light utilization efficiency of a projector by the optical rod polarization conversion module (2) is:

$\eta_{inc} = \Delta\Psi_R + \Delta\Psi_L$;

wherein:

$$\Delta\Psi_R = 0.5 \times \beta \times T_L \times T_P \times \left\{ \sum_{n=1}^{\infty} [R_P \times (1 - A_S/A_L) \times R_M \times T_L^2]^n \times (1-\beta)^{n-1} \right\};$$

$$\Delta\Psi_L = 0.5 \times \beta \times T_L \times T_P \times \left[ \sum_{n=1}^{\infty} (R_P \times L_R \times T_L^2 \times A_S/A_L)^n \times (1-\beta)^{n-1} \right];$$

$\Delta\Psi_R$ represents a corresponding increment of the light utilization efficiency of the projector by the reflecting part (2102); $\Delta\Psi_L$ represents a corresponding increment of the light utilization efficiency of the projector by the LED light source (1); $\beta$ represents a modulation efficiency of the polarized light modulation plate (22); $T_L$ represents transmittance of the integration rod (21); $T_P$ and $R_P$ respectively represent transmittance and reflectance of the brightening polarizer (23); $A_S$ represents an area of the light transmitting part (2101); $A_L$ represents an area of the incident surface of the integration rod (21); $R_M$ represents a surface reflectance of the reflecting part (2102); and $L_R$ represents a combined reflectance of the light emitting surface (101) and the substrate (102) of the LED light source (1).

* * * * *